United States Patent [19]

Caughey

[11] 4,030,895
[45] June 21, 1977

[54] APPARATUS FOR PRODUCING COMBUSTIBLE GASES FROM CARBONACEOUS MATERIALS

[76] Inventor: Robert A. Caughey, Clinton Road, Antrim, N.H. 03440

[22] Filed: Mar. 17, 1976

[21] Appl. No.: 667,673

[52] U.S. Cl. .................... 48/111; 34/57 C; 48/101; 48/197 R; 48/209; 110/7 A; 110/7 R; 201/34; 202/129; 252/373
[51] Int. Cl.² ............................. C10J 3/00
[58] Field of Search .......... 48/111, 76, 77, 101, 48/203, 209, 210, 197 R, DIG. 4; 201/33, 34; 202/129; 110/7 A, 7 R, 102; 252/373; 34/57

[56] References Cited

UNITED STATES PATENTS

| | | | |
|---|---|---|---|
| 1,423,527 | 7/1922 | Johns | 201/33 |
| 1,813,156 | 7/1931 | Gilchrist | 110/7 R |
| 1,832,092 | 11/1931 | Burnside | 48/203 |
| 2,187,872 | 1/1940 | Winkler et al. | 48/DIG. 4 |
| 2,866,696 | 12/1958 | Godel | 48/203 |
| 3,722,433 | 3/1973 | Kramer | 110/7 R |
| 3,852,048 | 12/1974 | Pyle | 48/209 |

FOREIGN PATENTS OR APPLICATIONS 351,494   6/1931   United Kingdom ............. 48/76

Primary Examiner—Robert L. Lindsay, Jr.
Assistant Examiner—George C. Yeung
Attorney, Agent, or Firm—Robert T. Gammons

[57] ABSTRACT

A reactor for generating combustible fuel gases comprising a chamber, an inclined grate extending from adjacent the top of the chamber to near the bottom and sloping forwardly within the chamber from the top to the bottom, said grate dividing the chamber into a primary chamber at the forward side of the grate and an antechamber at the rear side, a conveyor for delivering a solid fuel such as wood chips and other chopped-up woody material to the upper end of the grate at a rate to maintain a continuous bed of fuel from top to bottom, a blower for delivering primary air to a plenum chamber at the downwardly facing side of the grate to sustain combustion of the fuel at the lower end of the bed and to generate sufficient heat above the place of combustion to effect destructive distillation of a portion of the fuel in the bed above the place of combustion said primary air at said place of combustion converting the charcoal remaining after distillates have passed off descending from the place of distillation to CO and ash, an ash pit at the lower end of the grate for receiving the ash, a conveyor situated in the ash pit for removal of the ash to make room for descent of the fuel from above and a port in the forward wall of the mixing chamber at the downwardly facing side of the grate thru which the mixed distillate and CO are removed.

17 Claims, 6 Drawing Figures

APPARATUS FOR PRODUCING COMBUSTIBLE GASES FROM CARBONACEOUS MATERIALS

BACKGROUND OF INVENTION

Recently because of the high cost of oil, gas and electricity the use of bio-mass materials such as wood chips, bark, sawdust and the like for heating and generation of power is being seriously considered as a supplement to and even a replacement for oil, gas and electricity. Such apparatus as is available generates so much air borne ash that it is objectionable from the standpoint of pollution and is rapidly rendered ineffective by deposits of tar and resin on the grates and in the flues. The apparatus of this invention is designed to convert bio-mass materials such as wood, wood chips, sawdust, bark and the like to a combustible gas without generation of pollutants either in the form of solid particles such as ash or condensates such as tars and resins and to obtain a maximum BTU value per unit of wood consumed.

SUMMARY OF INVENTION

As herein illustrated the apparatus for generating combustible gas from bio-mass materials comprises a closed retort within which there is supported a downwardly and forwardly extending grate which divides the retort into a plenum chamber at the downwardly facing side of the grate and a mixing chamber at the upwardly facing side of the grate. There is a conductor in communication with the interior of the retort at the top for supplying the wood in the form of chips to the grate, a port at the bottom of the retort in communication with the interior thru which primary air can be induced to the downwardly facing side of the grate and a discharge port at the forward side of the mixing chamber thru which the gaseous products can be delivered to the fire box of a furnace or other heating unit in the form of a gaseous combustible fuel for combustion therein. A conveyor such as a screw is arranged to deliver wood chips to the conductor at the top at a rate to maintain a continuous supply to the grate and a blower is provided for introducing primary air to the port at the bottom of the plenum chamber at a rate to produce maximum efficiency in the conversion without carrying solid particles forwardly from the grate into the mixing chamber and at a controlled rate which determines the rate of distillation and $C \rightarrow CO$ conversion. A pit at the lower end of the grate is arranged to gravitationally receive the ash below the path of flow of the primary air and convection currents so as to isolate the ash and there is a conveyor such as a screw in the pit for removing the ash, operation of the latter being controlled so as to remove ash only when the temperature in the pit is below that of the burning coals at the lower end of the grate. A conductor may be employed to connect the stack of the furnace or heating unit to which the mixed gases are supplied as a fuel to the conveyor by means of which the wood chips are delivered to the grate to dry the chips and preheat the same and when such a conductor is employed an induction fan is also employed to maintain the necessary draft in the furnace or heating unit and to deliver the hot gases of combustion from the furnace or heating unit to the conveyor. The retort comprises a base from which rises a cupola and the grate which may be in the form of horizontally arranged louver-like bars or spaced grids comprising transversely spaced parallel bars divides the retort from the top to bottom into said plenum and mixing chamber which are narrower at the top than at the bottom. A vibrator may be employed to effect vibration of the grate and a refractory lining may be applied to a part or all of the interior of the retort.

The method of generating gas from bio-mass material according to the invention as carried out by the apparatus described above gravitationally moving a layer of wood chips downwardly and forwardly on the upwardly facing side of an inclined grate within a confining retort such as to form a bed of chips of more or less uniform thickness, establishing a zone of combustion near the lower end of the grate, supplying primary air to the rear side of the bed in the zone of combustion to effect reduction of the chips in such zone to CO and ash, heating of the chips above the zone of combustion to a temperature to effect destructive distillation of the chips and the evolution of the gaseous medium, collecting the ash at the lower end of said zone of combustion below the path of flow of the primary air and convection currents, removing the collected ash so as to promote progressive gravitational descent of the distilled chips above the zone of combustion into the zone of combustion and combining the mixture of evolved gaseous medium and CO at the forward side of the bed. Removal of the ash at the lower end of the combustion zone is effective only when the temperature at the lower end is lower than the burning charcoal. The chips are supplied to the upper end of the bed at a rate to maintain a continuous layer of chips and the primary air is supplied at a rate to maintain combustion without causing the solid particles and ash to become air borne. The chips may be dried and preheated prior to delivery to the zone of distillation.

The invention will now be described in greater detail with reference to the accompanying drawings wherein.

Figure 1:
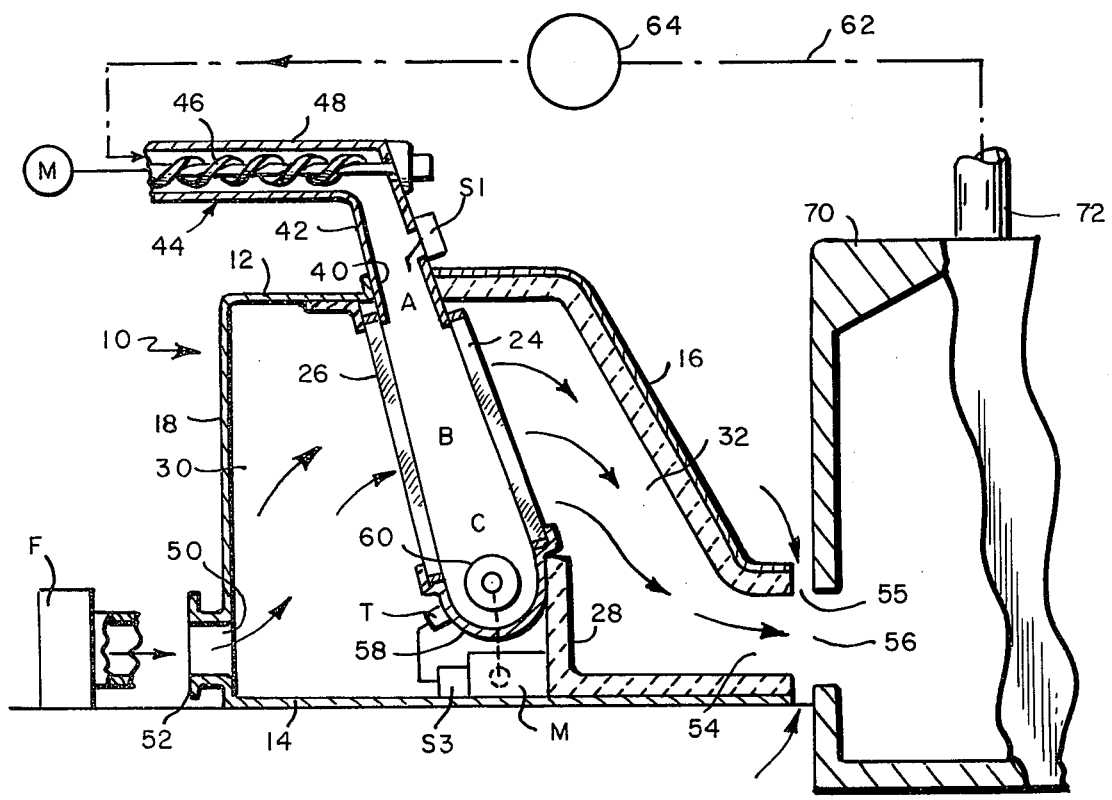
FIG. 1 is a vertical section illustrating one form of the apparatus wherein the grate is comprised of spaced grids.
Figures 2, 3:
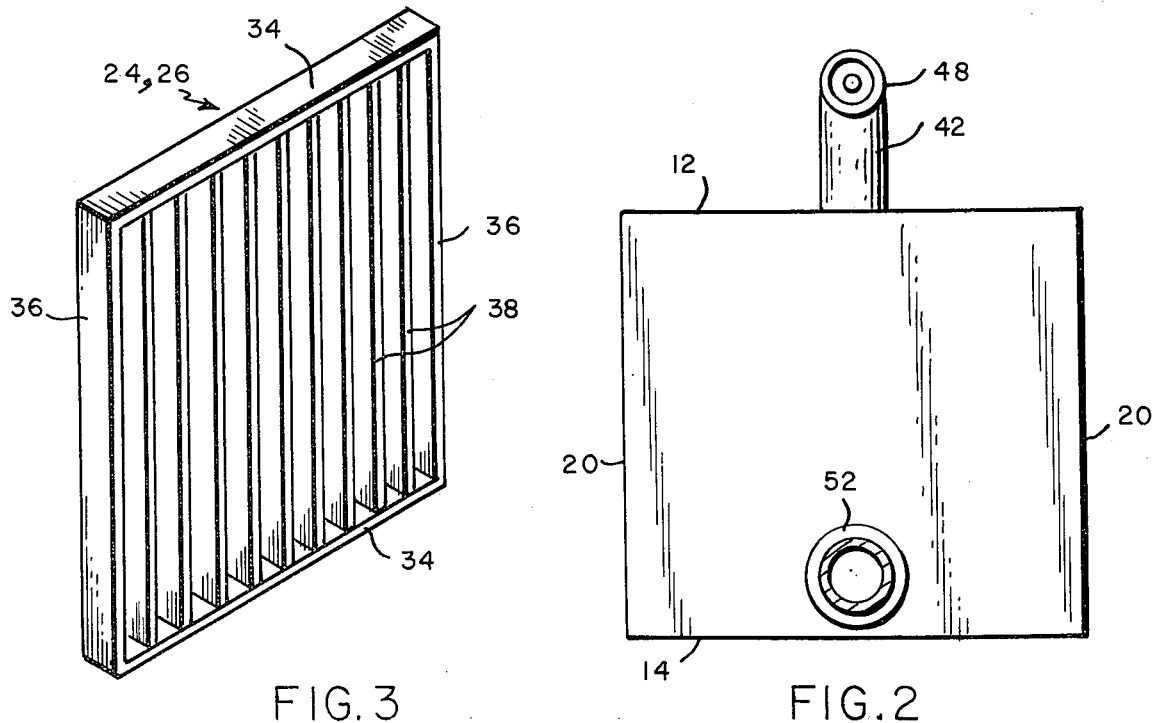
FIG. 2 is a rear elevation of FIG. 1.
FIG. 3 is a perspective of one of the grids of the grate used in the unit shown in FIG. 1.

The apparatus of this invention is designed to convert bio-mass materials such as wood, wood chips, sawdust and other woody materials to a combustible gas and deliver it to the fire box of a domestic heating unit or commercial boiler and in one form as shown in FIGS. 1, 2 and 3, comprises a sheet metal box 10 having top and bottom walls 12 and 14, front and back walls 16 and 18 and side walls 20-20 which define an interior retort. Intermediate the front and back walls extending transversely throughout the entire width of the box from side wall to side wall there is a grate comprising downwardly and forwardly inclined grids 24 and 26 which in conjunction with a fire wall 28 perpendicular to the bottom wall 14 divide the interior of the retort into a plenum chamber 30 and a mixing chamber 32.

The grids 24 and 26 are of identical construction each comprising, as shown in FIG. 3, a rectangular frame having spaced parallel top and bottom frame members 34-34, spaced parallel side frame members 36-36 and intermediate the latter spaced parallel bars 38 which are parallel to the side frame members 36-36. The grids are made of steel with a spacing of ⅛ to ½ inch between the bars depending upon the size of the chips or other particulate material to be processed. A typical grid would be made of ¼ inch by 1¼ inch bars spaced on ¾ inch centers with the bars as uniformly parallel as possible and finished so as to be free of any obstructions on their surfaces. As illustrated the grids diverge slightly from top to bottom to facilitate downward flow of the fuel in the space between them as it is consumed, however, if the fuel flows readily without such divergence the grids may be parallel. The grate is inclined with respect to the vertical at an angle of approximately 30°, however, the inclination may be varied to increase the angle of inclination or decrease it according to the flowability of the material being processed. If the fuel is sufficiently resistant to free flow the forward grid 24 may be omitted.

At the top of the combustion chamber there is an opening 40 in the top wall 12 which provides communication with the interior of the retort at the upper end of the grate for receiving the lower end of a conductor 42 by means of which the material to be burned is delivered to the space between the grids. The conductor 42 is connected at its upper end to a conveyor 44 which is herein shown as a screw 46 rotatably supported within a manifold 48. The conveyor is driven by a suitable motor so as to transfer the chips from a hopper, not shown, to the upper end of the conductor 42.

There is a port 50 in the rear wall of the retort near the bottom through which primary air is delivered to the plenum chamber 30 at the downwardly facing side of the grate. A blower F of conventional construction is coupled to a flange pipe 52 surrounding the port 50 for supplying the primary air to the plenum chamber 30. There is also a port 52 in the forward wall of the retort near the bottom designed to be connected to an opening 56 in communication with the fire box of a domestic heater or boiler so as to transmit the gases generated in the retort directly to the fire box. Secondary air is introduced to the mixed combustible gases as they enter the heater thru openings 55 provided at the junction of the port 54 with the opening 56 as indicated diagrammatically by the arrows. The interior surface of the walls 12, 14, 16 and 20 defining the mixing chamber 32 are refractory lined. The corresponding portions of the walls defining the plenum chamber 30 may or may not be so lined.

At the lower end of the grate and behind the fire wall 28 there is an ash pit in the form of a trough 58 which is spaced from the bottom and extends transversely of the plenum chamber from side wall to side wall into which the ash gravitates and within the pit there is mounted a conveyor in the form of a screw 60 which is rotated periodically as will be described hereinafter to remove the ash.

A chip level switch S1 which controls the operation of the conveyor 44 is located in the conductor 42 to maintain the bed of chips between the grids, a switch S2 is located in the bin from which the chips are supplied to maintain an adequate supply to the conveyor and a switch S3 is provided for controlling the rate of discharge of the conveyor 60, operation of the latter being controlled by a thermostat T mounted in the pit 58 adjacent the lower end of the grate.

The operation is started by feeding chips thru the manifold 48 to the upper end of the conductor 42 wherein they gravitationally descend into the open space between the grids forming a relatively thick layer or bed of predetermined uniform thickness. When the space between the grids becomes filled the chips are ignited at the downwardly facing side of the grate at approximately the region C while primary air is supplied to support combustion thru the port 50. The primary combustion will proceed upwardly toward the region B. As the chips descend from the region A in the conductor 42 toward the region B they will be progressively heated to a point where distillation will begin at a temperature slightly in excess of 450° F. so that in the region between zones A and B a gaseous distillate is evolved which enters the upper part of the mixing chamber 32. The conductor 42 above the grates is solid imperforate and since there is no draft at this point distillation at the zone A will not occur. As the distillation progresses the size of the wood chips shrink until at the region C only charcoal remains. In the region C the only reaction will be the conversion of the carbon charcoal to carbon monoxide which will be drawn into the mixing chamber and become mixed with the gaseous products of distillation. As this conversion takes place only a small amount of ash will remain and this will drop down into the pit 58 where it will be removed by means of the screw 60. The pit as illustrated is located at the very lower end of the grate behind the fire wall 28 so that ash that drops into it becomes substantially isolated and out of the path of flow of the primary air so that it does not become air borne and carried over into the mixing chamber. In order to insure that the screw 60 removes only ash a thermostat T is provided to control the switch S3 for driving the screw only when the temperature over the screw is less than that of the burning charcoal.

As long as the fuel bed is maintained between the grids the rate of distillation and thus the ultimate heat output of the system can be controlled by regulation of the flow of primary air. This air flow will determine the rate in which the incoming fuel can be elevated to distillation temperature and also the rate of conversion of charcoal to carbon monoxide. The mixed gaseous products of distillation and CO combine in the mixing chamber and are delivered to the fire box and the boiler together with secondary air, if required.

It may be desirable to dry the chips to remove excessive moisture and preheat them to a temperature somewhat near the temperature of distillation as they enter the space between the upper ends of the grids and so there is provided means for heating the chips in the hopper or on their way from the storage hopper thru the manifold 48 to the grate. The means employed may, for example, be the hot gases of combustion emitted from the heating unit or boiler delivered to the hopper or manifold thru a suitable conductor 62 including an induction draft fan 64. The hot gases from the unit or boiler would normally be lost to the atmosphere but by conducting them to the hopper the chips may be heated to a temperature of approximately 120° F. to 125° F. By following this procedure green chips just as they are received from the wood chipper may be used with an efficient evolution of wood gas.

It is also possible to recycle a portion of the hot gases produced within the unit by conducting some of these gases into and thru the manifold 48 so that the chips can actually be delivered to the upper end of the grate at a temperature close to the point of incipient destructive distillation, for example 325° F., and by so doing substantially increased distillation rate may be maintained.

It is also possible to conduct a portion of the burning charcoal from the region C to the region A where it can be admixed with the fresh incoming chips so as to substantially increase the rate at which the incoming fuel mass is raised to the distillation temperature. The admixture of a portion of the hot coals with the fresh chips can increase the capacity of the unit by two to three times which would be a considerable factor in determining the size of the unit for the particular installation desired. Desirably, the hot coals should be removed before complete distillation so that it still contains a controlled residual of volatiles.

Figures 4, 5:
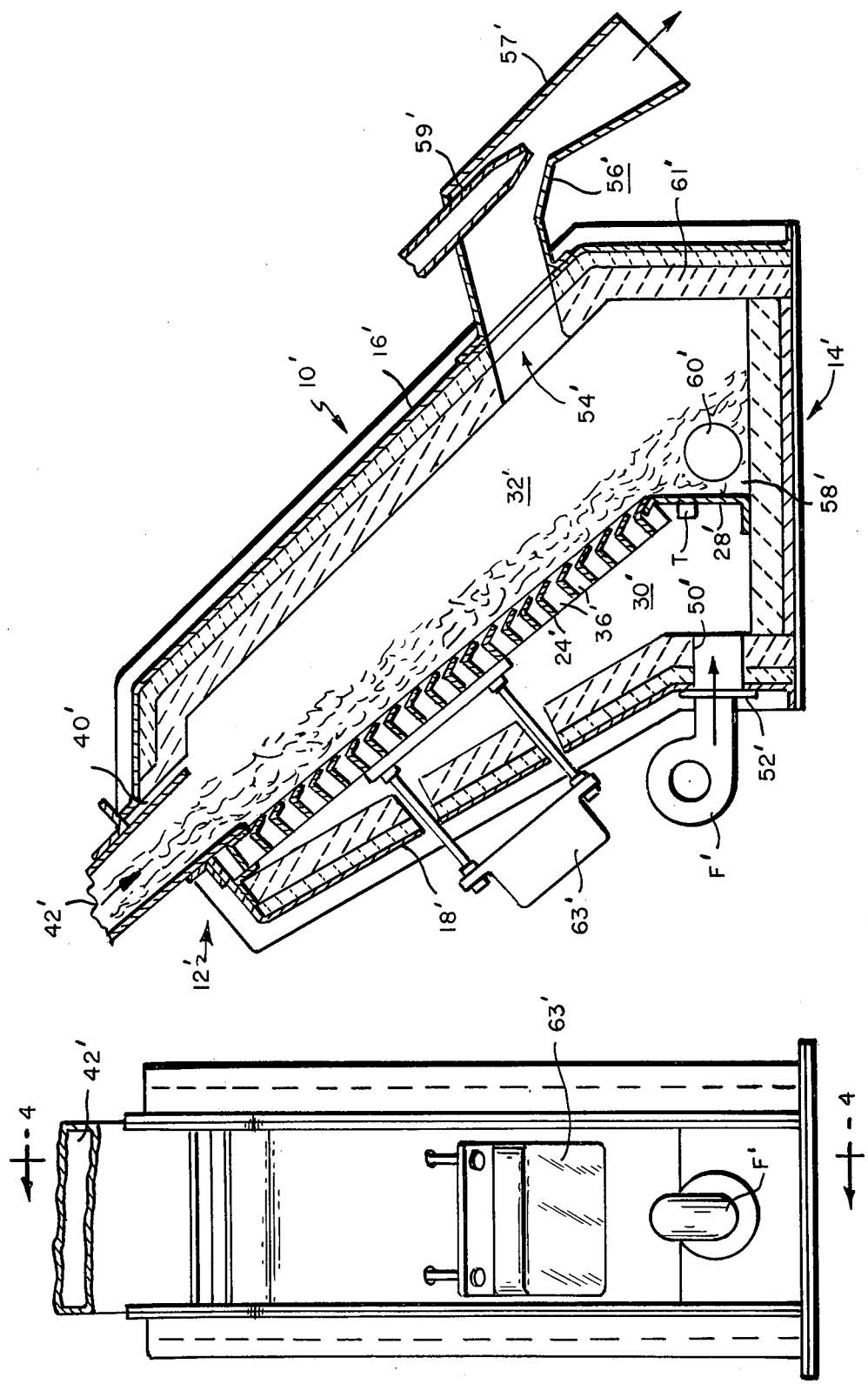
FIG. 4 is a vertical section illustrating another form of the apparatus wherein the grate is comprised of a single grid.
FIG. 5 is a rear elevation of FIG. 4.

A modification of the apparatus is shown in FIGS. 4 and 5 wherein the retort comprises a sheet metal box $10^1$ having top and bottom walls $12^1$ and $14^1$, front and back walls $16^1$ and $18^1$ and side walls $20^1$-$20^1$ which define an interior combustion chamber. Intermediate the front and back walls extending transversely throughout the entire width of the box from side wall to side wall there is a grate comprising horizontally arranged grid bars $24^1$ which in conjunction with a riser $28^1$ perpendicular to the bottomwall $14^1$ divides the combustion chamber into a plenum chamber $30^1$ and a mixing chamber $32^1$.

The grid bars $24^1$ of the grate are of L-shaped cross section and are fastened in spaced parallel relation between spaced parallel frame members $36^1$-$36^1$ so as to overlap in louver-like form and so that overlapping portions defined a downwardly and forwardly sloping fuel supporting surface. In this form of the apparatus the top of the grid is arranged so that it is adjacent to the rear wall and the bottom is approximately halfway to two-thirds the way between the back and front walls. The upwardly facing side of the grid is nearly parallel to the front wall. The overlapping bars permits the use of finely dried fuels, such as wood shaving, sawdust, etc. without the danger of unburned fuel falling thru the grate. Also, the inclined bars help to reduce carry over of particles. With this grate system, using dry hardwood chips, heat outputs have been developed of up to 500,000 BTU/hrs per square foot of grate use.

At the top of the retort there is an opening $40^1$ in the top wall $12^1$ which provides communication with the interior of the mixing chamber at the upper end of the grate for receiving the lower end of a conductor $42^1$ by means of which the material to be burned is delivered to the surface of the grate. The conductor $42^1$ is connected at its upper end to a conveyor, not shown, the latter being driven by a suitable motor so as to transfer chips from a hopper to the upper end of the conductor $42^1$.

At the bottom of the plenum chamber $30^1$ there is a port $50^1$ thru which primary air is delivered to the plenum chamber $30^1$ at the downwardly facing side of the grate. A blower $F^1$ of conventional construction is coupled to a flange $52^1$ surrounding the port $50^1$ for supplying primary air to the plenum chamber. The mixing chamber $32^1$ has at the bottom a port $54^1$ which is connected by a conductor $56^1$ and venturi $57^1$ to the fire box of a domestic heater or boiler so as to transmit the gases generated by the unit directly to the fire box. Secondary air is delivered to the venturi thru a conductor $59^1$. The venturi not only provides for mixing the gases but also to induce the mixture to flow into the fire box of the unit within which it is to be burnt as a fuel.

The interior walls of the entire retort are lined with a refractory material $61^1$.

At the lower end of the grate and forwardly of the riser $28^1$ there is an ash pit $58^1$ which is below the lower level of the grate and well below the port $54^1$ into which the ash gravitates and within the pit there is mounted a conveyor in the form of a screw $60^1$ which is rotated periodically to remove the ash.

As described with reference to the apparatus shown in FIGS. 1 to 3 a chip level switch S1 controlling the feed screw is provided in the conductor $42^1$ to maintain a uniform bed of chips on the grate, a switch S2 is located in the supply bin from which the chips are supplied to maintain an adequate supply of chips, and a switch S3 is provided to control the rate of discharge of the conveyor $60^1$, operation of the latter being controlled by a thermostat T mounted in the pit $58^1$ adjacent the lower end of the grate.

The operation of the apparatus shown in this form of the invention is the same as that described with reference to the form illustrated in FIGS. 1 to 3 and hence need not be repeated herein.

The specific configuration of the apparatus shown in FIGS. 4 and 5 appears to be the more satisfactory for adoption as a standard commercial product and seems to be especially effective in the handling of a wide variety of fuel types. Units of this configuration have been built and tested and have developed up to 1.7 million BTU/hour.

In this form of the invention a vibrator $63^1$ may be employed which, as shown, is connected to the rear side of the grate thru suitable openings in the rear wall for the purpose of vibrating the grate to assist in the smooth downward movement of the fuel over the surface of the grate bars. Such vibration is used principally for light fuels.

Figure 6:
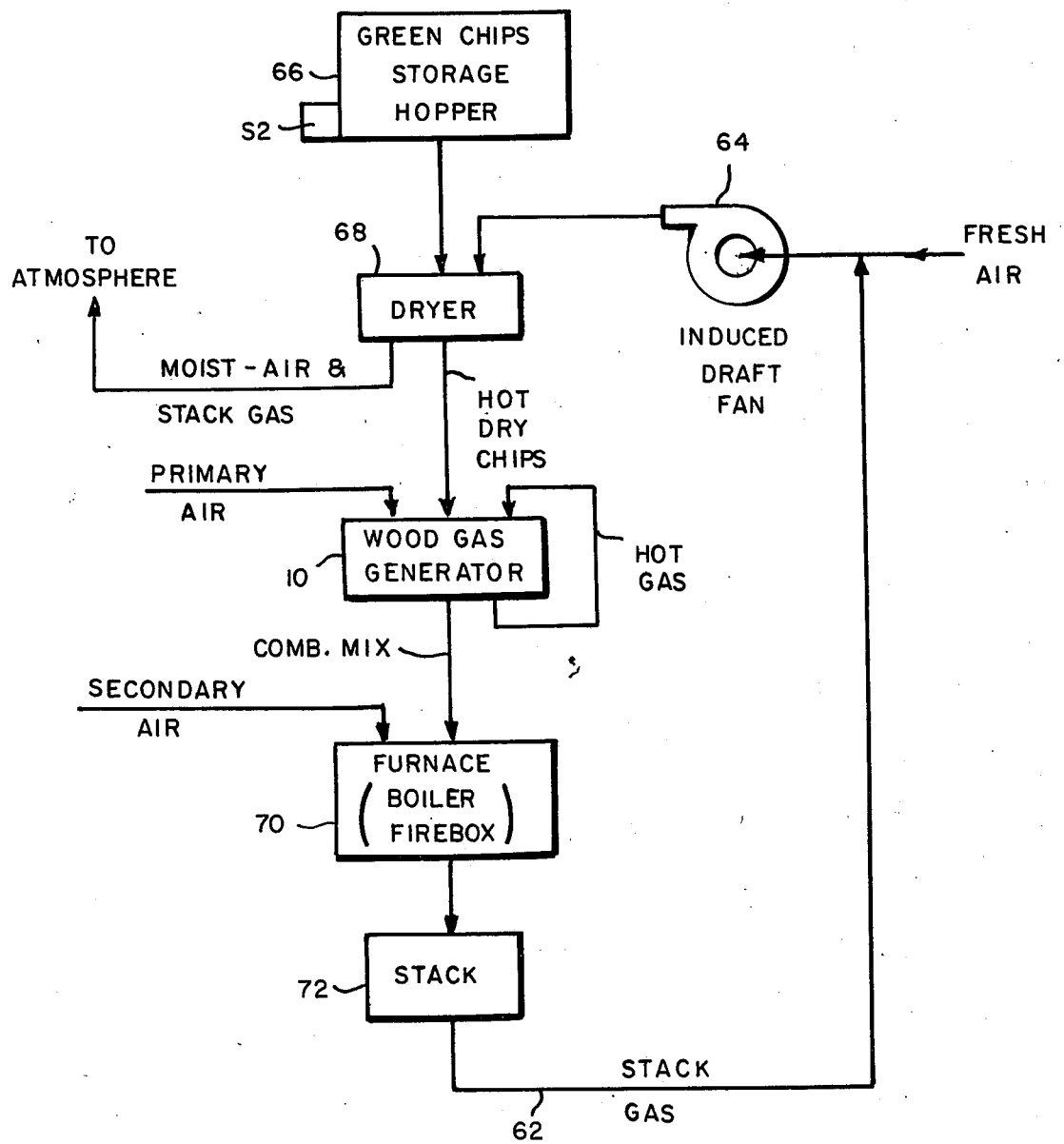
FIG. 6 is a flow chart diagrammatically illustrating the progress of the chips going through the apparatus for the generation of wood gas.

FIG. 6 is a flow chart diagrammatically illustrating the progress of the chips from the storage hopper 66 in the form of green chips to a drier 68 which may be the manifold 48 and from thence to the wood gas generator 10 where the chips are converted to gas, the delivery of the gas to the furnace 70 for which it is the fuel and finally the delivery of the products of combustion produced in the furnace to the stack 72. The stack gases, as shown, may be conducted back thru a conduit 62 to the drier 68 together with a quantity of fresh air by means of the fan 64 and from the drier to the atmosphere. Primary air is introduced to the unit, hot gases are recirculated and secondary air is delivered to the furnace, all as diagrammatically illustrated in the flow chart.

EXAMPLE 1

Starting with dry approximately 5% moisture content chips of mixed origin of approximately ½ inch, produced for example in a conventional wood chipping machine, and supplying them to the grate to form a bed of approximately 2 inches in thickness from back to front, a mixture of gaseous products of distillation and CO were evolved at the rate of 40 cubic feet per minute having a heat value of 8000 BTU per pound of chips delivered to the grates.

EXAMPLE 2

Starting with the same mixed chips but in the green condition and pre-drying with the waste heat from the stack the green chips may be brought to a dry condition to give the same heat value as those in Example 1.

Throughout the performance of the apparatus tests were made of the stack gases produced and it was found that the solid matter carried over was too low to be measurable by conventional equipment used for stack gas particulates. Furthermore, daily use for a period of three months of the unit for seasoning lumber in dry kilns resulted in no noticeable deposit of tar or resins on the interior surface of the unit, the grates and/or the ducts leading to and from the unit.

Conventional boiler controls may be employed to control the primary air and thru such control effect modulation of the output. Modulation of the heat load can be had by controlling both the primary and secondary air. By regulating the feed of fuel and use of primary air to control heating of the fuel to above a temperature necessary to effect destructive distillation and controlling the rate of conversion of C to CO the rate of fuel feed may be established.

The apparatus is capable of reducing bulk material, for example, municipal waste, bark or sawdust and agriculture waste such as beet pulp, straw, rice hulks, etc.

While the grates shown in both forms of the apparatus are stationary it is within the scope of the invention to employ movable grates, that is, grates which constitute in effect conveyors for moving the fuel thru the second zone.

The terminology "bio-mass" material used herein is to generically include materials derived from vegetable matter essentially cellulosic in composition which would include not only woody material but coal as distinct from liquid or gaseous materials.

It should be understood that the present disclosure is for the purpose of illustration only and includes all modifications or improvements which fall within the scope of the appended claims.

I claim:

1. A reactor for producing combustible gases suitable for delivery to the fire box of a furnace comprising means defining a confining retort, spaced grates, means supporting the grates in said retort so as to slope downwardly from the top at one side to the bottom at the other side, said grates defining a narrow space between them for gravitational movement of a bed of bio-mass material therebetween from the top of the retort to the bottom, said grates dividing the retort into a combining chamber at the upwardly facing sides of the grates and a plenum chamber at the downwardly facing sides of the grates, said combining chamber embodying a refractory lining including a fire wall rising from the bottom of the retort to the lower ends of the grates so as to separate the two chambers, means supported across the open space between the grates at their lower ends within the retort which constitutes an ash pit which extends the entire transverse length of the grates below the grates, means for supplying bio-mass material to the space between the grates at the top to form a bed of bio-mass material in the space defined by said grates, and an inlet opening at the bottom of the plenum chamber for supplying primary air thereto.

2. Apparatus according to claim 1 wherein the biomass is converted to a mixture of combustible gases and ash and there is means for at times removing the ash at the lower end of the grates to induce the biomass material above the zone of burning to descend into the zone of burning as the bio-mass material is converted to said mixture of combustible gases and ash, said means comprising a screw conveyor.

3. Apparatus according to claim 1 wherein the biomass is converted to a mixture of combustible gases and ash comprising means defining an ash pit within the retort subtending the lower ends of the grates for constraining downward movement of the bio-mass material in the space between the grates so long as the ash at the lower end is not removed, a screw operable in the pit to remove the ash therefrom and means for effecting operation of the screw when the temperature of the ash is less than that of the burning bio-mass.

4. Apparatus according to claim 1 comprising means for detecting the absence of the bio-mass material at the upper ends of the grates and means responsive thereto to supply bio-mass material to the upper ends of the grates.

5. Apparatus for producing combustible gas suitable for delivery to the fire box of a furnace comprising a retort, a grate assembly comprising spaced grate members, means supporting the grate assembly in the retort in a downwardly and forwardly inclined position, means for forming a bed of bio-mass material of substantially uniform thickness between the grates for gravitational movement downwardly within the retort, said grates dividing the retort into fore and aft chambers located, respectively, at the upwardly facing side of the grates and the downwardly facing side of the grates, said chambers containing, respectively, openings through which gases generated within the retort are withdrawn and through which primary air is supplied to sustain burning of the bio-mass material gravitationally descending between the grates, means defining a trough supported within the retort across the space between the open lower ends of the grates for receiving the ash which is formed, a conveyor in the trough for removing the ash, means in the trough for starting and stopping the conveyor at a predetermined temperature and means at the top of the retort responsive to the absence of bio-mass material at the upper end of the grate to supply bio-mass material to the grates.

6. Apparatus according to claim 5 wherein the grates diverge downwardly.

7. Apparatus according to claim 5 wherein the retort at the fore side of the grates contains a refractory lining.

8. Apparatus according to claim 5 comprising a hopper for storage of bio-mass material and means for drying the bio-mass material while in the hopper.

9. Apparatus according to claim 5 comprising means for recirculating part of the distillate and CO through the bed of bio-mass material above the zone of distillation.

10. Apparatus for producing combustible gases suitable for delivery to the fire box of a furnace comprising a retort containing at the top an opening, a grate, means supporting the grate in the retort in a downwardly inclined position with its upper end adjacent the opening at the top, said grate dividing the retort into a plenum chamber at the downwardly facing side and a mixing chamber at the upwardly facing side, means for feeding bio-mass material through the top opening to the upwardly facing side of said downwardly inclined grate in the form of a substantially uniformly thick bed for burning of the bio-mass material resting on the grate in the zone near the lower end of the grate and destructive distillation of the bio-mass material resting on the grate and the evolution of a gaseous medium in the zone above the zone of burning, said plenum chamber at the downwardly facing side of the grate containing an opening defining means for supplying a controlled volume of primary air to the plenum chamber at the downwardly facing side of the grate in the zone of burning to sustain combustion and to convert the burning material to CO and ash, means for removing the ash from the zone of burning at the lower end of the grate, means for adding bio-mass material to the upper end of the grate to maintain a continuous production of the gaseous medium and CO, said mixing chamber at the upwardly facing side of the grate defining means for collecting the gaseous medium and CO at the upwardly facing side of the grate and containing an opening defining means for discharging the gaseous medium and CO to the fire box of a furnace.

11. A reactor according to claim 10, wherein the grate has horizontal transversely extending louver bars defining a downwardly and forwardly inclined supporting surface.

12. A reactor according to claim 10 wherein there is means associated with the grate for effecting its vibration.

13. Apparatus according to claim 10 wherein the grate is inclined at the angle of repose of the bio-mass material being subjected to treatment.

14. Apparatus for generating combustible gases suitable for use in a heat generating plant comprising a retort, a grate, means supporting the grate in the retort in the downwardly inclined position, such as to divide the retort into a plenum chamber at the lower side of the grate and a mixing chamber at the upper side of the grate, means defining a conductor at the upper end of the retort for conducting bio-mass material to the surface of the grate at the upper end to form a bed of bio-mass material on the grate, means for supplying bio-mass material to the conductor for gravitational descent on the surface of the grate to a zone of burning at the lower end of the grate and the destructive distillation of the bio-mass material and evolution of gaseous material in the zone above the zone of burning, said plenum chamber at the downwardly facing side of the grate containing an opening defining means for supplying primary air in a volume to convert the burning bio-mass in the zone of burning to CO and ash, and said confining conduit at the upper end of the grate excluding the primary air from contact with the bio-mass material until it is discharged therefrom onto the grate, and means for removing ash from the burning zone at the lower end of the grate to maintain a continuous production of gases, said mixing chamber defining means for collecting the generated gases at the upwardly facing side of the grate and containing an opening defining means for delivering the mixed gases.

15. The method of generating combustible gases from a bio-mass material, comprising forming a substantially uniformly thick bed of bio-mass material on the upwardly facing side of a downwardly inclined grate supported within a confining retort, establishing a zone of combustion within the retort on the upwardly facing side of the grate near the lower end thereof, supplying primary air to the retort at the downwardly facing side of the grate in the zone of combustion to heat the descending bio-mass material to progressively convert the mass as it descends from the top of the grate to said zone of combustion to a gaseous medium and charcoal and at the zone of combustion to convert the charcoal to CO and ash, removing the ash from the zone of combustion at the lower end of the grate so that the distilled bio-mass material above the zone of combustion descends progressively into said zone of combustion and is converted to CO and ash, combining the evolved gases and CO within the mixing chamber at the upwardly facing side of the grate, and supplying fresh bio-mass material to the upper end of the inclined grate at a rate to restrict the upwardly moving combustion to the lower end of the grate.

16. A method of generating combustible gases from bio-mass material comprising supporting a substantially uniformly thick bed of bio-mass material within a confining retort on the upwardly facing surface of a downwardly inclined grate for gravitation thereon through successive zones of destructive distillation and combustion such that the bio-mass material resting on the grate as it moves from the zone of distillation to the zone of combustion is subjected to progressively increasing degrees of destructive distillation and carbonization, supplying primary air to the downwardly facing side of the bed at said zone of combustion to convert the carbonized material to CO and ash and to generate sufficient heat to initiate destructive distillation of the bio-mass material resting on the grate in the zone of distillation above the zone of burning, removing the ash from the zone of combustion at the lower end of the grate and supplying bio-mass material to the grate at the upper end of the zone of distillation to replace the consumed material at a rate to confine burning of said bio-mass material through the lower end of the grate.

17. A method of generating combustible gases from bio-mass material comprising forming a bed of bio-mass material of substantially uniform thickness within a confining retort in the space defined by spaced downwardly inclined grates supported in said retort, burning the bio-mass material at the lower end of the grate with sufficient primary air to convert the bio-mass material to a combustible mixture of gases and ash with an upward evolution of heat through the bed of the bio-mass material above the zone of combustion to produce destructive distillation of the bio-mass material and formation of charcoal by the time it reaches the zone of combustion, supplying primary air to the charcoal at the zone of combustion in sufficient quantity to convert the charcoal to CO and ash without $O_2$ and $CO_2$, gravitationally feeding the bio-mass material to the upper end of the grate for gravitational movement downwardly therealong and removing the ash at the lower end of the grate when the temperature is lower than that of the burning charcoal.

* * * * *